United States Patent
Kaminski et al.

(10) Patent No.: US 7,742,534 B2
(45) Date of Patent: Jun. 22, 2010

(54) METHOD FOR TRANSMITTING USER DATA IN A MULTI-CARRIER RADIO COMMUNICATION SYSTEM, AND CORRESPONDING RECEIVER

(75) Inventors: Stephen Kaminski, Eislingen (DE); Ralph Ballentin, Birkenwerder (DE)

(73) Assignee: Alcatel Lucent, Paris (FR)

( * ) Notice: Subject to any disclaimer, the term of this patent is extended or adjusted under 35 U.S.C. 154(b) by 880 days.

(21) Appl. No.: 11/483,720

(22) Filed: Jul. 11, 2006

(65) Prior Publication Data
US 2007/0025459 A1 Feb. 1, 2007

(30) Foreign Application Priority Data
Aug. 1, 2005 (EP) .................................. 05300634

(51) Int. Cl.
*H04K 1/10* (2006.01)
(52) U.S. Cl. ................... 375/260; 375/316; 375/358; 455/450; 455/452.2
(58) Field of Classification Search .............. 375/260, 375/316, 358; 455/450, 452, 452.1, 452.2
See application file for complete search history.

(56) References Cited

U.S. PATENT DOCUMENTS

| | | | | |
|---|---|---|---|---|
| 5,726,978 | A * | 3/1998 | Frodigh et al. | 370/252 |
| 6,266,531 | B1 * | 7/2001 | Zadeh et al. | 455/453 |
| 6,397,077 | B1 * | 5/2002 | Jensen | 455/553.1 |
| 2002/0119781 | A1 * | 8/2002 | Li et al. | 455/450 |
| 2002/0181421 | A1 * | 12/2002 | Sano et al. | 370/335 |
| 2005/0232135 | A1 * | 10/2005 | Mukai et al. | 370/208 |
| 2005/0286547 | A1 * | 12/2005 | Baum et al. | 370/437 |
| 2006/0198293 | A1 * | 9/2006 | Nishio et al. | 370/208 |
| 2007/0025458 | A1 * | 2/2007 | Kaminski et al. | 375/260 |
| 2007/0025459 | A1 * | 2/2007 | Kaminski et al. | 375/260 |
| 2008/0287066 | A1 * | 11/2008 | Tandai et al. | 455/45 |
| 2009/0042529 | A1 * | 2/2009 | Lindenmeier et al. | 455/277.2 |

FOREIGN PATENT DOCUMENTS
EP 1699197 A1 9/2006

OTHER PUBLICATIONS

Nishio et al; WO/2005/015801, "Radio Communciation Device and Radio Communication Method", Feb. 17, 2005.*
Patrick Svedman: "Multiuser Diversity Orthogonal Frequency Division Multiple Access Systems." ' Online! Dec. 2004, pp. 11-21, XP002359965.

* cited by examiner

*Primary Examiner*—Temesghen Ghebretinsae
(74) *Attorney, Agent, or Firm*—Fay Sharpe LLP

(57) ABSTRACT

The present invention relates to a method for transmitting user data between a transmitter and a receiver in a multi-carrier radio communication system having a plurality of orthogonal frequency sub-carriers, said method comprising the steps of selecting a set of sub-carriers on which said user data are to be transmitted between said transmitter and said receiver.

According to the present invention, the method comprises the steps of:
Sending from said transmitter, before transmission of said user data, an indication related to a threshold;
Determining at the receiver a quality level for each sub carriers;
Selecting at said receiver sub carriers to received said user data as a function of said indication related to a threshold and of said quality levels.

18 Claims, 2 Drawing Sheets

METHOD FOR TRANSMITTING USER DATA IN A MULTI-CARRIER RADIO COMMUNICATION SYSTEM, AND CORRESPONDING RECEIVER

TECHNICAL FIELD

The invention is based on a priority application EP 05300634.2 which is hereby incorporated by reference.

The present invention relates to a method for optimizing the use of the feedback forward cannel in multi-carrier systems.

BACKGROUND OF THE INVENTION

Such multi-carrier systems often implement Orthogonal Frequency Division Multiplexing (OFDM) as multi-carrier transmission technique. OFDM is for example used in the HIPERLAN/2 standard as well as an extension of the IEEE 802.11a standard for the 5 Ghz area. OFDM could also offer a sensible alternative for high-speed mobile applications, and thus represents an important step for next generation mobile radio systems or for a $4^{th}$ generation air interface. To this extend, the $3^{rd}$ Generation Partnership Project (3GPP), for the standardization of high-speed broadband wireless mobile communication systems, is recently considering the application of OFDM techniques for the high speed data packet access (HSDPA) air interface communication between the radio access network (RAN) and the user equipment (UE).

In multi-carrier systems as OFDM transmission system, the transmitted data is split into a number of parallel data streams, each one used to modulate a separate sub-carrier. In other words, the broadband radio carrier is subdivided into a plurality of narrow-band subcarriers or sub-carriers being independently modulated with e.g. QPSK, 16 QAM, 64 QAM or higher modulation order allowing higher data rate per sub-carrier.

In such OFDM systems, the sub-carrier frequencies can be allocated to a user carrier on a short term basis (e.g. all 2 ms) as well the modulation order per sub-carrier defining a transmission carrier for each user should be updated on the same short term basis.

A very important task of such multi carrier systems to provide for an efficient sub-carrier/modulation allocation to the different users. This is necessary to optimize and extend the performance of the multi-carrier system.

The selection of the best appropriate sub-carrier for each user should take into account that in mobile environment with multipath radio carriers some sub-carriers may be subject to very strong carrier attenuation when seen by a given user. Such sub-carriers would be uselessly allocated to this user because of fading. On the contrary, they may be received with good quality by other users.

The selection of the sub-carriers to be used between a base station and a UE should be coordinated between the transmitter and the receiver to avoid errors. In prior art, a message indicating the sub-carriers to be used is exchanged between the transmitter and the receiver in the feed forward carrier i.e. on the same carrier to be used for transmitting user data and prior to the transmission of the user data. This kind of signaling information consumes a not negligible bandwidth and time so that the effective payload data rate is reduced accordingly.

The message containing the sub-carriers to be used represents a huge amount of signaling information (some 100 Kbits) especially in multi carrier system with up to thousand sub-carriers.

A particular object of the present invention is to provide a method for sending information on the sub-carriers to be used between a transmitter and a receiver in a more efficient way so that the amount of signaling information in the feed forward carrier is reduced but anyway sufficient for performing an efficient resource allocation in the multi carrier system.

Another object of the invention is to provide a corresponding receiver.

SUMMARY OF THE INVENTION

These objects, and others that appear below, are achieved by a method for transmitting user data in a multi-carrier radio communication system according to claim 1, and a receiver according to claim 6.

The method according to the present invention presents the advantage to reduce the signaling load on the feedforward channel while enabling it to send a higher useful data throughput on the feed forward carrier.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
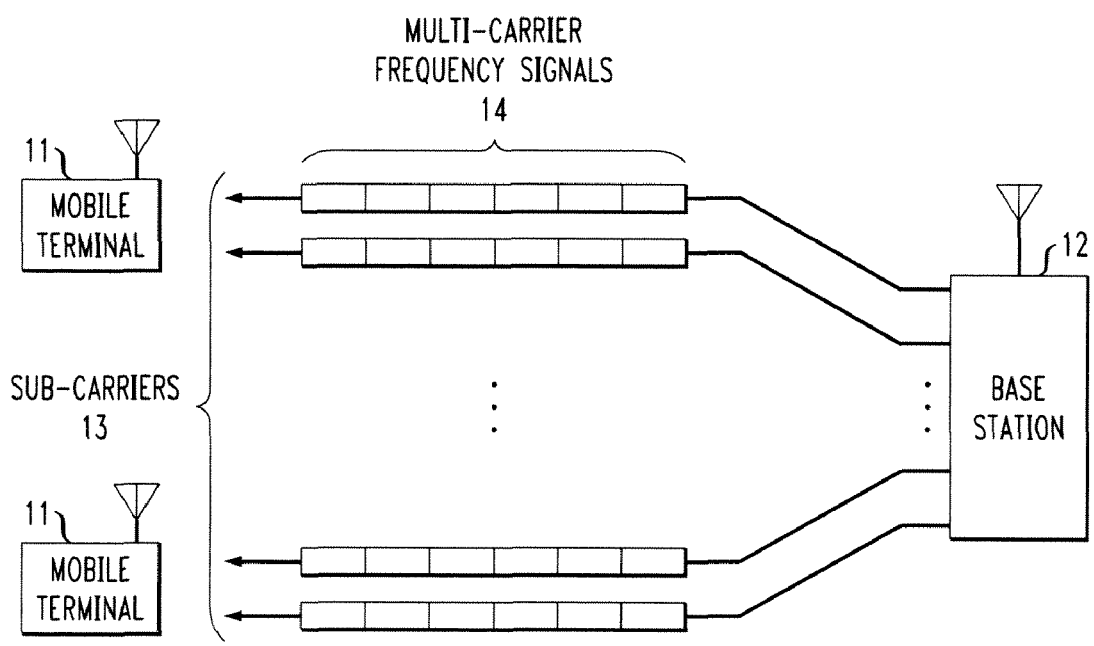
FIG. 1 shows an illustration of a network using multi-carrier transmission in the downlink and sending feed forward signaling indicating the sub-carriers to be used in the downlink.

FIG. 1 shows an illustration of a network using multi-carrier transmission in the downlink. Mobile terminals 11 are receiving multi-carrier frequency signals 14 in the downlink from base station 12 over a plurality of sub-carriers 13. Additionally, base station 12 sends an indication on the sub carriers used for the transmission prior to user data transmission to mobile terminals 11.

The multi-carrier network may comprises up to thousand sub-carriers which can be allocated to mobile terminals 11. Preferably, several sub-carriers 13 are allocated to each mobile terminal 11 in order to match the high throughput received from base station 12 in the downlink. The frequency separation between the sub-carriers is chosen so that the sub-carriers are orthogonal to one another (i.e. the data transmitted on one sub-carrier is not causing interference on the data sent on the other sub-carriers).

According to the present invention, a indication related to the sub carriers to be used for transmission by base station 12 to the different mobile terminals 11 is sent on at least one sub carrier of the feed forward carrier. This sub carrier is known from mobile stations 11.

Alternatively, a plurality of sub carriers may contain the indication related to a threshold, the indication being associated to a mobile terminal specific identifier. The mobile terminal then listens to the sub-carriers and, when detecting its specific mobile terminal identifier, reads the corresponding indication related to a threshold. Further ways of transmitting the indication related to a threshold to the mobile terminals may be envisaged without departing from the scope of the present invention.

Contrary to prior art solutions, not the extensive references of the sub-carriers to be used are sent in the feed forward carrier. Only an indication related to a threshold is sent on the feed forward carrier. Thanks, to additional and concordant information present at the transmitter 12 and at the receiver 11, the receiver 11 is able to deduce from the indication related to a threshold the set of sub carriers on which the transmission will be performed by base station 12.

According to the present invention, the additional and concordant information present at the transmitting base station 12 as well as at the receiving mobile terminals 11 are a quality level for the different sub-carriers of the system. Preferably, such an information is the SIR for the different sub carriers as measured at mobile terminals 11 and sent on the feedback carrier to the base station 12.

Preferably, this quality level is sent according to a method object of a parallel European patent application Nr 05 290 0177 filed by the applicant and incorporated herein by reference.

Alternatively, the quality level for each sub-carriers may be a bit error rate.

Preferably, the quality level is determined for group of sub-carriers. The sub-carriers are grouped the following way: a predefined number N of consecutive sub-carriers form a group, the next N consecutive sub-carriers form the next group and so on. The grouping is preferably defined at system initialization.

The quality level for a group of sub-carriers may be an averaged value of the carrier quality values measured on the sub-carriers 13 belonging to the group of sub-carriers.

Alternatively the quality level could be determined for each single sub-carrier. This would nevertheless require more signaling.

The feed forward carrier may be advantageously implemented according to HSDPA (High Speed Downlink Packet Access) specification where the information for selecting the sub-carriers according to the invention are sent from base station 12 to mobile terminals 11 over a HS-SCCH (High Speed Shared Control Channel) having a capacity of around 60 Kbit/s.

Figure 2:
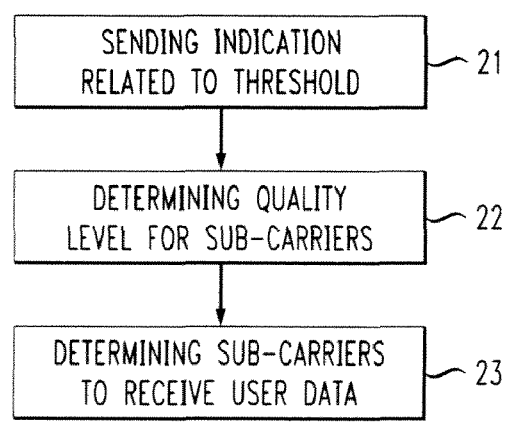
FIG. 2 shows an implementation of the method for transmitting user data in a multi-carrier radio communication system according to the present invention.

FIG. 2 shows an implementation of the method for transmitting user data in a multi-carrier radio communication system. According to the present invention, the method comprises following steps:

Step 21 consists in sending from base station 12 to mobile terminals 11, before transmission of user data, an indication related to a threshold. This indication is preferably sent on one predefined sub carrier of the multi carrier system and received at mobile terminal 11. Alternatively, a plurality of sub carriers may contain the indication related to a threshold, the indication being associated to a mobile terminal specific identifier. The mobile terminal then listens to the sub-carriers and, when detecting its specific mobile terminal identifier, reads the corresponding indication related to a threshold.

Step 22 consists in determining at the mobile terminal a quality level for the sub carriers of the multi carrier system. Preferably, the quality level consists in a SIR measurement at the mobile terminal. This measurement should advantageously be made at regular time interval in order to track channel change as fast as possible and avoid incompatibility with channel quality available at base station 12 and at mobile terminals 11.

Step 23 consists in determining at the mobile terminal the sub-carriers to be listened to receive user data destined to this mobile as a function of the indication related to a threshold and of the quality level of the sub carriers.

Preferably, the function addressed in step 23 consists in arranging the sub carriers in quality level decreasing order and to select the sub carriers starting with the sub carrier having the highest quality level and continuing to select the sub carriers with decreasing quality level until the indication related to a threshold is reached.

The indication related to a threshold can be a number of sub carrier to select. Then if this indication is N, the receiver should select the N sub-carriers having the highest quality level.

Alternatively, the indication related to a threshold can be quality threshold. Then, if the quality threshold is noted Qthr, the receiver should select the sub carriers having a quality level higher than Qthr.

It will be clear for persons skilled in the art that other kinds of indication related to a threshold may be envisaged without departing from the scope of the present invention.

It will also be clear that other type of functions can be envisaged without departing from the scope of the present invention.

Examples of implementation of the present invention will be given in the following.

It will be assumed that 4 Quality Levels (QL) are defined in the system and that a quality level is assigned to each group of N sub carriers (SCG) and N is set to 8.

A result of the quality level report at a mobile terminal A may be: QL=4 in SCGs 1,2,6,8; QL=2 in SCG 3; QL1 in SCGs 4,5,7.

A result of the quality level report at a mobile terminal B may be: QL=4 in SCG 4; QL=3 in SCG 7; QL=1 in SCGs 1,2,3,5,6,8.

In a first embodiment the indication related to a threshold is a quality level threshold:
  mobile terminal A receives the indication that the quality level threshold it should consider is QL=4.
  mobile terminal B receives the indication that the quality level threshold it should consider is QL=3.

According to the invention, following interpretation is performed in the mobile terminals:
  mobile terminal A will be scheduled with all SCs belonging to the SCGs that have a QL equal to or above QL=4, i.e. SCGs 1,2,6,8, meaning the 32 SCs belonging to the SCGs 1,2,6,8.
  mobile terminal B will be scheduled with all SCs belonging to the SCGs that have a QL equal to or above QL=3, i.e. the 16 SCs belonging to the SCGs 4 and 7.

In a second embodiment the indication related to a threshold is a number of SCGs.
  mobile terminal A receives the indication that the number of SCGs=4.
  mobile terminal B receives the indication that the number of SCGs=2.

According to the invention following interpretation is performed in the mobile terminals:
  mobile terminal A will be scheduled with all SCs belonging to the 4 SCGs that have the highest QL, i.e. SCGs 1,2,6,8, meaning the 32 SCs belonging to the SCGs 1,2,6,8.
  mobile terminal B will be scheduled with all SCs belonging to the 2 SCGs that have the highest QL, i.e. the 16 SCs belonging to the SCGs 4 and 7.

Generally, when the quality levels are defined in a way that they already indicate the thresholds for the usage of a certain modulation scheme (e.g. QL=1 for BPSK, QL=2 for QPSK, QL=3 for 16QAM, QL=4 for 64QAM), the UE will already be able to identify the modulation scheme that will be used on the different SCs. In the example, the result is as follows:

mobile terminal A will receive a 64 QAM modulated signal on the 32 SCs belonging to SCGs 1,2,6,8.

mobile terminal B will receive a 16 QAM modulated signal on the 8 SCs in SCG 7 and a 64 QAM modulated signal on the 8 SCs in SCG 4.

Figure 3:
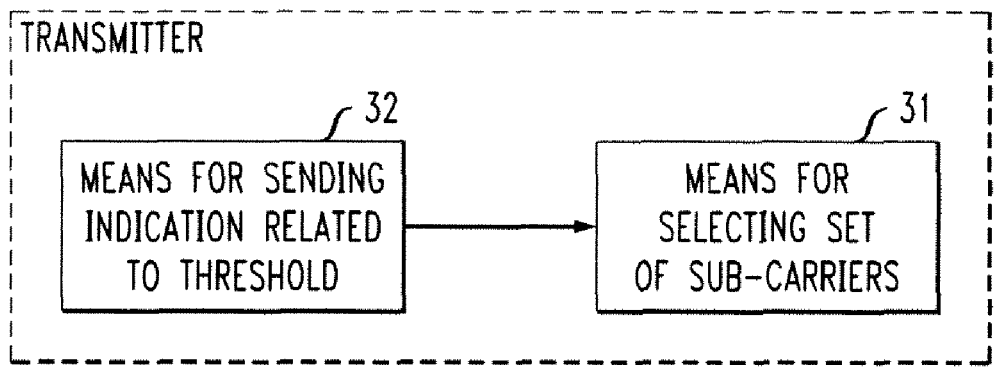
FIG. 3 shows an implementation for a transmitter according to the present invention.

FIG. 3 shows an implementation for a transmitter according to the present invention. The transmitter comprises means 31 for selecting a set of sub carriers on which the user data are to be transmitted to a receiver and means 32 for sending before the transmission of user data on a feed forward channel an indication related to a threshold so that the receiver can deduce from concordant information available at the transmitter as well as at the receiver the set of sub carriers which will be used for transmission.

The concordant information are quality information preferably in form of Signal to Interference Ratio (SIR) for the different sub carriers which are preferably measured at the receiver and send back to the transmitter on a feedback channel so that the information are available on both side of the radio link and are concordant.

The information related to a threshold can be a quality threshold indicating that the used sub carriers are the one having a SIR higher that the threshold. Alternatively, the information related to a threshold can be a natural number indicating the number of sub carriers to be used starting with the one having the best SIR and continuing with sub carriers with SIR in decreasing order until the natural number is reached.

In a preferred embodiment of the present invention, the transmitter is a base station of an OFDMA system for example but not restricted to HSDPA or WIMAX.

Figure 4:
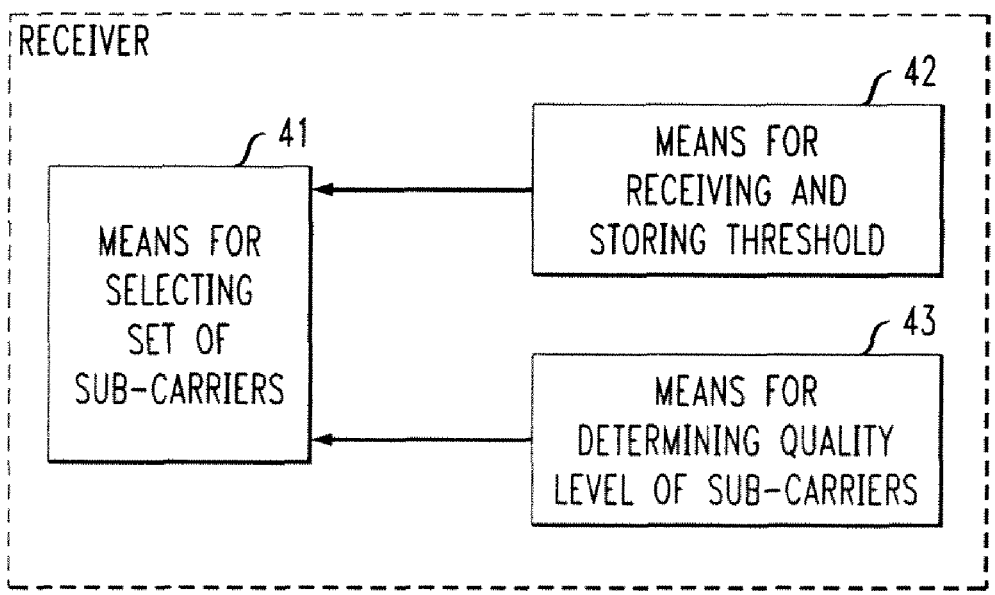
FIG. 4 shows an implementation for a receiver according to the present invention.

FIG. 4 shows an implementation for a receiver according to the present invention.

The receiver comprises means 41 for selecting a set of sub-carriers to receive user data from a transmitter, means 42 for receiving and storing a threshold, means 43 for determining a quality level for each sub carriers or for groups of sub carriers. Means 41 for selecting a set of sub carriers are connected to means 42 for storing a threshold and means 43 for determining a quality level.

Means 41 for selecting a set of sub carriers selects the sub carriers referred by means 43 as having a quality level higher than the threshold stored by means 42.

Alternatively, means 41 selects the sub carriers starting with the one having the highest quality level referred by means 42 and continuing with sub carriers with decreasing quality level until the number of sub carriers indicated by the threshold stored in means 42 is reached.

In a preferred embodiment of the present invention, the receiver is a terminal of an OFDMA system for example but not restricted to HSDPA or WIMAX.

The invention claimed is:

1. Method for transmitting user data between a transmitter and a receiver in a multi-carrier radio communication system having a plurality of orthogonal frequency sub-carriers, said method comprising the steps of at the receiver, determining quality levels for said sub-carriers;

sending said quality levels from said receiver to said transmitter;

selecting, based on said quality levels, a set of sub-carriers on which said user data is to be transmitted between said transmitter and said receiver, from said transmitter, before transmission of said user data, sending an indication related to a threshold, said indication and said quality levels enabling said receiver to deduce said set of sub-carriers on which said user data is to be transmitted; and at said receiver, selecting said set of sub-carriers on which said user data is to be transmitted as a function of said indication and of said quality levels.

2. Method according to claim 1, wherein said function comprises the step of selecting said sub-carriers to receive said user data starting with the sub-carriers having the highest quality level and continuing with selecting the sub carrier with decreasing quality level until said threshold is reached.

3. Method according to claim 1, wherein said threshold is related to a quality level threshold.

4. Method according to claim 1, wherein said threshold is related to a maximal number of sub-carriers to be used.

5. Method according to claim 1, wherein quality levels are calculated at said receiver for groups of sub carriers.

6. An apparatus to facilitate communication of user data in a multi-carrier radio communication system having a plurality of orthogonal frequency sub-carriers, the apparatus comprising:

means for selecting a set of sub-carriers from the plurality of sub-carriers on which user data is to be communicated from a transmitter to a receiver, said selecting based at least in part on at least one of sub-carrier quality levels and a threshold indication associated with sub-carriers, said quality levels communicated from the receiver to the transmitter and said threshold indication communicated from the transmitter to the receiver; said threshold indication and said quality levels enabling said receiver to deduce said set of sub-carriers on which said user data is to be communicated; and a radio link for communicating user data via the selected set of sub-carriers;

wherein said receiver is adapted to receive user data from said transmitter via the radio link, said receiver comprising:

means for selecting said set of sub-carriers on which said user data is to be received from said transmitter;

means for determining quality levels for sub-carriers;

means for sending said quality levels to said transmitter; and means for receiving and storing said threshold indication from said transmitter, said threshold indication and said quality levels enabling said receiver to deduce said set of sub-carriers on which said user data is to be received;

wherein said set of sub-carriers on which said user data is to be received are deduced as a function of said threshold indication and said quality levels.

7. The apparatus set forth in claim 6 wherein said threshold indication is one of a maximum number of sub-carriers in the set of sub-carriers and a minimum sub-carrier quality level for the set of sub-carriers.

8. The apparatus set forth in claim 6 wherein each sub-carrier quality level identifies at least one of a signal-to-interference ratio, a bit error rate, and a modulation scheme for a corresponding sub-carrier or a corresponding sub-carrier group.

9. The apparatus set forth in claim 6, the means for selecting said set of sub-carriers comprising:

means for selecting sub-carriers or sub-carrier groups with the highest quality level and decreasing quality levels until the threshold indication is reached.

10. The apparatus set forth in claim 6 wherein said threshold indication is received via at least one sub-carrier of the selected set of sub-carriers.

11. The apparatus set forth in claim 6, the means for receiving and storing said threshold indication comprising:
means for reading the threshold indication on at least one sub-carrier of the selected set of sub-carriers after detecting a specific identifier associated with the receiver on said at least one sub-carrier.

12. The apparatus set forth in claim 6, said receiver comprising a mobile terminal.

13. The apparatus set forth in claim 6, further comprising:
said transmitter adapted to transmit user data to said receiver via the radio link, said transmitter comprising:
means for selecting said set of sub-carriers on which said user data is to be transmitted to said receiver;
means for receiving said quality levels from said receiver; and
means for sending said threshold indication to said receiver, said threshold indication and said quality levels enabling said receiver to deduce the set of sub-carriers on which said user data is to be transmitted.

14. The apparatus set forth in claim 13 wherein said threshold indication is sent via at least one sub-carrier of the selected set of sub-carriers.

15. The apparatus set forth in claim 13, said transmitter comprising a base station.

16. A method of facilitating communication of user data in a multi-carrier radio communication system having a plurality of orthogonal frequency sub-carriers, comprising:
selecting a set of sub-carriers from the plurality of sub-carriers on which user data is to be communicated from a transmitter to a receiver, said selecting based at least in part on at least one of sub-carrier quality levels and a threshold indication associated with sub-carriers, said quality levels communicated from the receiver to the transmitter and said threshold indication communicated from the transmitter to the receiver, said threshold indication and said quality levels enabling said receiver to deduce said set of sub-carriers on which said user data is to be transmitted;
selecting said set of sub-carriers on which said user data is to be received from said transmitter at said receiver;
determining quality levels for sub-carriers at said receiver;
sending said quality levels from said receiver to said transmitter; and
receiving and storing said threshold indication from said transmitter at said receiver, said threshold indication and said quality levels enabling said receiver to deduce the set of sub-carriers on which said user data is to be received;
wherein said set of sub-carriers on which said user data is to be received are deduced as a function of said threshold indication and said quality levels.

17. The method set forth in claim 16, further comprising:
selecting said set of sub-carriers on which said user data is to be transmitted to said receiver at said transmitter;
receiving said quality levels from said receiver at said transmitter; and
means for sending the threshold indication from said transmitter to said receiver, said threshold indication and said quality levels enabling said receiver to deduce said set of sub-carriers on which said user data is to be transmitted.

18. The method set forth in claim 16, further comprising:
selecting said set of sub-carriers by selecting sub-carries or sub-carrier groups with the highest quality level and decreasing quality levels until the threshold indication is reached.

* * * * *